United States Patent
Sakurai

(10) Patent No.: US 9,269,181 B2
(45) Date of Patent: Feb. 23, 2016

(54) TEXTURE MAPPING DEVICE

(75) Inventor: Satoshi Sakurai, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 201 days.

(21) Appl. No.: 13/978,659

(22) PCT Filed: Apr. 4, 2011

(86) PCT No.: PCT/JP2011/002001
§ 371 (c)(1),
(2), (4) Date: Jul. 8, 2013

(87) PCT Pub. No.: WO2012/137243
PCT Pub. Date: Oct. 11, 2012

(65) Prior Publication Data
US 2013/0278598 A1    Oct. 24, 2013

(51) Int. Cl.
*G09G 5/00* (2006.01)
*G06T 15/04* (2011.01)

(52) U.S. Cl.
CPC ..................................... *G06T 15/04* (2013.01)

(58) Field of Classification Search
CPC ....... G06T 15/005; G06T 15/04; G06T 11/40; G06T 11/01
See application file for complete search history.

(56) References Cited

U.S. PATENT DOCUMENTS

| | | | |
|---|---|---|---|
| 6,476,818 | B1 | 11/2002 | Ito |
| 2002/0012002 | A1 | 1/2002 | Ito |
| 2005/0030317 | A1 | 2/2005 | Spicer |
| 2007/0165035 | A1* | 7/2007 | Duluk et al. ................. 345/506 |
| 2009/0102851 | A1 | 4/2009 | Takemoto |

FOREIGN PATENT DOCUMENTS

| | | |
|---|---|---|
| JP | 8 110952 | 4/1996 |
| JP | 11 265459 | 9/1999 |
| JP | 2001 236523 | 8/2001 |

OTHER PUBLICATIONS

Ziyad S. Hakura and Anoop Gupta, "The Design and Analysis of a Cache Architecture for Texture Mapping", ISCA '97 Proceedings of the 24th annual international symposium on Computer architecture , vol. 25, Issue 2, May 1997, pp. 108-120.*
International Search Report Issued May 17, 2011 in PCT/JP11/002001 Filed Apr. 4, 2011.
German Office Action issued Feb. 2, 2015 in Patent Application No. 11 2011 105 126.3 (with English Translation).
Online-Encyclopedia "Wikipedia", Article re Term "Shader", Mar. 26, 2011, 4 pages.
Online-Encyclopedia "Wikipedia", Article re Term "Texture mapping", Apr. 3, 2011, 6 pages.
Online-Encyclopedia "Wikipedia", Article re Term "Rasterisation", Jan. 30, 2011, 8 pages.

* cited by examiner

*Primary Examiner* — Weiming He
(74) *Attorney, Agent, or Firm* — Oblon, McClelland, Maier & Neustadt, L.L.P.

(57) ABSTRACT

An area information generating unit generates plural pieces of area information each showing a partial area of a texture image. A polygon information generating unit generates polygon information including plural pieces of vertex information and an area ID. A rendering unit carries out interpolation on the texture coordinates of the vertices of a polygon on an output image to assign texture coordinates to each pixel located inside the polygon, and further acquires area information by referring to the area ID added to the polygon information and converts the texture coordinates assigned to each pixel of the output image in such a way that the texture coordinates fall within the area.

12 Claims, 13 Drawing Sheets

FIG.3
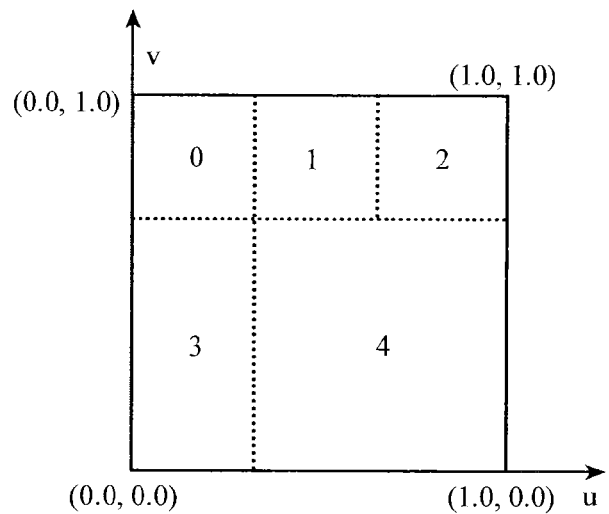
FIG.4
| ID | uR | vR | wR | hR |
|---|---|---|---|---|
| 0 | 0.00 | 0.67 | 0.33 | 0.33 |
| 1 | 0.33 | 0.67 | 0.33 | 0.33 |
| 2 | 0.67 | 0.67 | 0.33 | 0.33 |
| 3 | 0.00 | 0.00 | 0.33 | 0.67 |
| 4 | 0.33 | 0.00 | 0.67 | 0.67 |
FIG.5
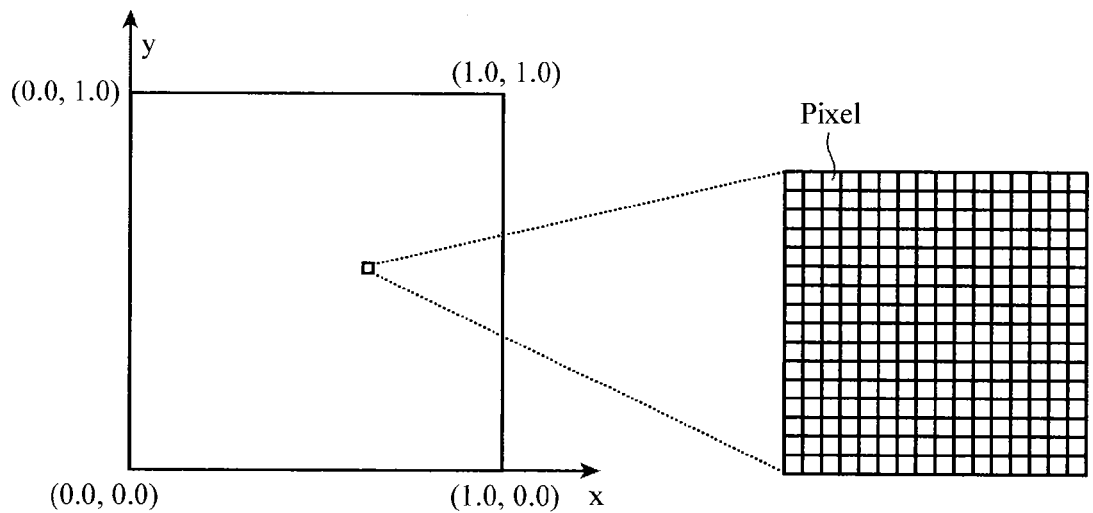

FIG.6

| Area ID | Vertex A | | | | Vertex B | | | | Vertex C | | | |
|---|---|---|---|---|---|---|---|---|---|---|---|---|
| | xA | yA | uA | vA | xB | yB | uB | vB | xC | yC | uC | vC |
| | 0.1 | 0.5 | 0.0 | 1.0 | 0.9 | 0.1 | 2.0 | 0.0 | 0.9 | 0.9 | 2.0 | 2.0 |

FIG.9

| Area ID | Vertex A | | | Vertex B | | | Vertex C | | |
|---|---|---|---|---|---|---|---|---|---|
| | xA | yA | uA | vA | xB | yB | uB | vB | xC | yC | uC | vC |
| 4 | 0.9 | 0.1 | 2.0 | 0.0 | 0.1 | 0.5 | 0.0 | 1.0 | 0.9 | 0.9 | 2.0 | 2.0 |

| Area ID | xP | yP | uP | vP |
|---|---|---|---|---|
| 4 | 0.2 | 0.6 | 0.25 | 1.25 |
| 4 | 0.3 | 0.6 | 0.5 | 1.25 |
| 4 | 0.4 | 0.6 | 0.75 | 1.25 |
| 4 | 0.5 | 0.6 | 1.0 | 1.25 |
| 4 | 0.6 | 0.6 | 1.25 | 1.25 |
| 4 | 0.7 | 0.6 | 1.5 | 1.25 |
| 4 | 0.8 | 0.6 | 1.75 | 1.25 |

| Area ID | xP | yP | uP' | vP' |
|---|---|---|---|---|
| 4 | 0.2 | 0.6 | 0.5 | 0.17 |
| 4 | 0.3 | 0.6 | 0.67 | 0.17 |
| 4 | 0.4 | 0.6 | 0.84 | 0.17 |
| 4 | 0.5 | 0.6 | 0.33 | 0.17 |
| 4 | 0.6 | 0.6 | 0.5 | 0.17 |
| 4 | 0.7 | 0.6 | 0.67 | 0.17 |
| 4 | 0.8 | 0.6 | 0.84 | 0.17 |

| Vertex A | | | | Vertex B | | | | Vertex C | | | |
|---|---|---|---|---|---|---|---|---|---|---|---|
| xA | yA | uA" | vA" | xB | yB | uB" | vB" | xC | yC | uC" | vC" |
| 0.1 | 0.5 | 400.0 | 1.0 | 0.9 | 0.1 | 402.0 | 0.0 | 0.9 | 0.9 | 402.0 | 2.0 |

| xP | yP | uP" | vP" |
|---|---|---|---|
| 0.2 | 0.6 | 400.25 | 1.25 |
| 0.3 | 0.6 | 400.5 | 1.25 |
| 0.4 | 0.6 | 400.75 | 1.25 |
| 0.5 | 0.6 | 401.0 | 1.25 |
| 0.6 | 0.6 | 401.25 | 1.25 |
| 0.7 | 0.6 | 401.5 | 1.25 |
| 0.8 | 0.6 | 401.75 | 1.25 |

FIG.21

| Texture ID | Vertex A | | | | Vertex B | | | | Vertex C | | | |
|---|---|---|---|---|---|---|---|---|---|---|---|---|
| | xA | yA | uA | vA | xB | yB | uB | vB | xC | yC | uC | vC |
| 0 | 0.1 | 0.1 | 0.0 | 0.0 | 0.9 | 0.1 | 2.0 | 0.0 | 0.9 | 0.4 | 2.0 | 2.0 |
| 1 | 0.1 | 0.6 | 0.0 | 0.0 | 0.9 | 0.6 | 4.0 | 0.0 | 0.9 | 0.9 | 4.0 | 4.0 |

FIG.22
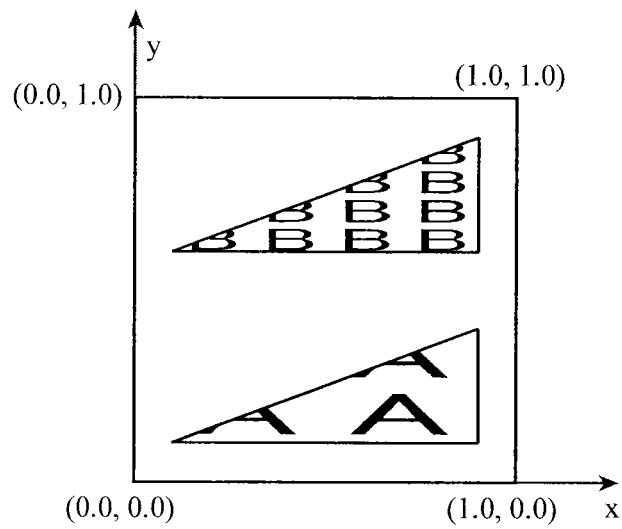
FIG.23
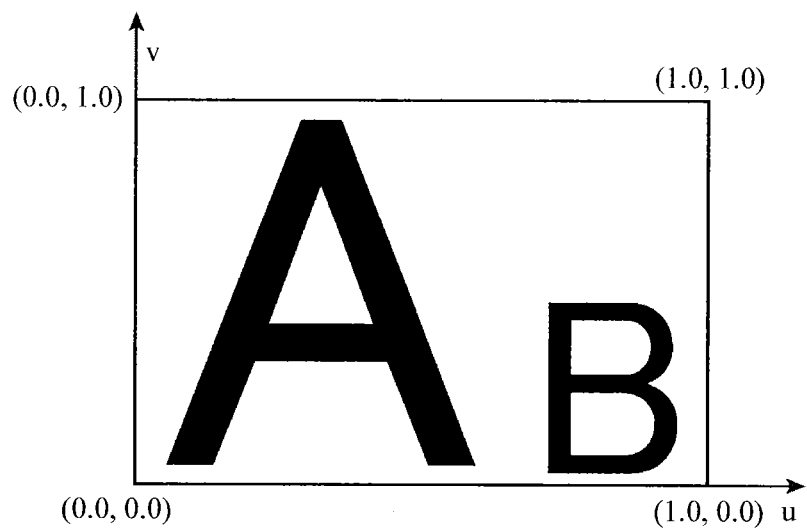
FIG.24
| ID | uR | vR | wR | hR |
|---|---|---|---|---|
| 0 | 0.00 | 0.00 | 0.67 | 1.0 |
| 1 | 0.67 | 0.00 | 0.33 | 0.5 |

TEXTURE MAPPING DEVICE

FIELD OF THE INVENTION

The present invention relates to a texture mapping device that determines color information of each pixel located inside a polygon by using a texture image when drawing the polygon in a graphics system or the like.

BACKGROUND OF THE INVENTION

In computer graphics, texture mapping for, in order to improve the power of expression of a polygon mainly used to express a three-dimensional model, assigning a two-dimensional image to the inside of the polygon to draw the polygon is known. When drawing a polygon by using texture mapping, data including the position coordinates of each of vertices within an output image and coordinates within a texture image which are brought into correspondence with each of the vertices (referred to as texture coordinates from here on) are prepared. Then, to each pixel located inside the polygon connecting among the vertices on the output image are assigned texture coordinates which are interpolated from the texture coordinates of the vertices. Finally, a pixel value is extracted from the texture image by using the texture coordinates assigned to above-mentioned each pixel and is copied to the output image, so that an output image in which the inside of the polygon is filled with the same pattern as the texture image is acquired.

In the texture mapping, the texture image can be repeatedly mapped within the polygon by assigning texture coordinates exceeding a range in which the texture image is defined to each vertex. Therefore, when repeatedly drawing an image having an identical pattern within the polygon, because there is no necessity to prepare a texture image in which the pattern is drawn repeatedly, and only one texture image is sufficient to repeatedly draw an image having the single pattern within the polygon, it is known that the data volume can be reduced.

On the other hand, it is known that when mapping different texture images onto a plurality of polygons, respectively, the use of a method of combining the plurality of texture images into a single texture image, and assigning texture coordinates in the single texture image into which the plurality of texture images are combined to each of the vertices of each polygon to draw the texture image makes it possible to draw the single texture image at a higher speed than that when using a method of preparing the plurality of texture images to draw these texture images. However, when using the above-mentioned single texture image into which the plurality of texture images are combined, specifying texture coordinates outside the area where the texture image is defined results in repetitions of mapping of the entire single texture image into which the plurality of texture images are combined onto the polygons, and each yet-to-be-combined texture image, i.e., a part of the single texture image into which the plurality of texture images are combined cannot be repeatedly mapped onto the polygons.

To solve this problem, when computing texture coordinates to be assigned to each pixel within a polygon on an output image, a conventional texture mapping device described in, for example, patent reference 1 adds a process of setting higher-order bits of the texture coordinates to 0 and adding an offset to the texture coordinates to select a rectangular area from a texture image and repeatedly map only this area onto the polygon.

RELATED ART DOCUMENT

Patent Reference

Patent reference 1: Japanese Unexamined Patent Application Publication No. Hei 8-110952

SUMMARY OF THE INVENTION

Problems to be Solved by the Invention

However, because the conventional device as described in above-mentioned patent reference 1 repeatedly provides texture coordinates with lower bits of the texture coordinates, each of the height and the width of the rectangular area is limited to a power of 2. A problem is therefore that when combining a plurality of texture images into a single texture image, and repeatedly mapping only a part of the single texture image into which the plurality of texture images are combined onto polygons by using the above-mentioned method, it is necessary to enlarge or reduce each of the yet-to-be-combined texture images in advance, and set each of the height and the width of the rectangular area to a power of 2. A further problem is that when reducing a texture image, the image quality degrades, and conversely, when enlarging a texture image, the texture image size of the combined result increases and the data size increases with the increase.

The present invention is made in order to solve the problems, and it is therefore an object of the present invention to provide a texture mapping device that can shorten the length of time required to carry out enlarging or reducing of each of the width and the height of a rectangular area to a power of 2 in advance, and that can use a texture image having required image quality expressed with a minimum size.

Means for Solving the Problem

In accordance with the present invention, there is provided a texture mapping device including: an area information generating unit for generating plural pieces of area information each showing a partial area of a texture image; a polygon information generating unit for generating polygon information including plural pieces of vertex information each including coordinates of a vertex on an output image and texture coordinates brought into correspondence with the vertex, and an area ID for specifying one of the plural pieces of area information; a rasterizing unit for generating pixel information including position coordinates, texture coordinates, and an area ID for every of all pixels located inside a polygon on the output image, the polygon being shown by the polygon information; a texture mapping unit for processing the texture coordinates of the pixel information by using the area information specified by the area ID of the pixel information, and for acquiring a pixel value from the texture image by using the processed texture coordinates and determining a pixel value of a pixel on the output image, the pixel being shown by the position coordinates of the pixel information, by using the pixel value acquired thereby; and an output unit for outputting an output of the texture mapping unit to an image display device, in which the polygon information generating unit does not hold the area ID which constructs the polygon information as an element of the polygon information directly, but processes each vertex information in such a way that the area ID can be reconstructed from the pixel information inputted to the texture mapping unit, thereby holding the area ID as a part of the vertex information.

Advantages of the Invention

Because the texture mapping device in accordance with the present invention generating plural pieces of arbitrary areas in the texture image as area information and processes the texture coordinates of the pixel information by using the area information specified by the area ID of the pixel information, and also acquires a pixel value from the texture image by using the processed texture coordinates and determines the pixel value of the pixel on the output image, which is specified by the position coordinates of the pixel information, by using the acquired pixel value, the texture mapping device can repeatedly map a rectangular area having an arbitrary width and an arbitrary height in the texture image to the polygon. Therefore, because the texture mapping device can shorten the length of time required to carry out enlarging or reducing of each of the width and the height of the rectangular area to a power of 2 in advance, and can prevent an increase in the image size or degradation in the image quality from resulting from the enlargement or reduction of each of the width and the height of the rectangular area, the texture mapping device can use the texture image having required image quality expressed with a minimum size.

BRIEF DESCRIPTION OF THE FIGURES

FIG. 3 is an explanatory drawing showing an example of area information on space defining a texture image in the texture mapping device in accordance with Embodiment 1 of the present invention;

FIG. 4 is an explanatory drawing showing an example of data of the area information shown in FIG. 3 in the texture mapping device in accordance with Embodiment 1 of the present invention;

FIG. 5 is an explanatory drawing showing an example of a coordinate system defining an output image and the output image in an initial state in the texture mapping device in accordance with Embodiment 1 of the present invention;

FIG. 6 is an explanatory drawing showing an example of polygon information generated by a polygon information generating unit in the texture mapping device in accordance with Embodiment 1 of the present invention;

FIG. 9 is an explanatory drawing showing a result of rearranging the polygon information shown in FIG. 6 by the rasterizing unit in the texture mapping device in accordance with Embodiment 1 of the present invention;

FIG. 21 is an explanatory drawing showing an example of plural pieces of polygon information inputted to the texture combining unit in the texture mapping device in accordance with Embodiment 2 of the present invention;

FIG. 22 is an explanatory drawing showing an output image acquired as a result of drawing the plural pieces of polygon information shown in FIG. 21 by using the texture images shown in FIG. 20 in the texture mapping device in accordance with Embodiment 2 of the present invention;

FIG. 23 is an explanatory drawing showing an example of a texture image acquired as a result of combining the plurality of textures shown in FIG. 20 by the texture combining unit in the texture mapping device in accordance with Embodiment 2 of the present invention; and FIG. 24 is an explanatory drawing showing area information generated by the texture combining unit when combining the texture images shown in FIG. 20 in the texture mapping device in accordance with Embodiment 2 of the present invention.

EMBODIMENTS OF THE INVENTION

Hereafter, in order to explain this invention in greater detail, the preferred embodiments of the present invention will be described with reference to the accompanying drawings.

Embodiment 1.

Figure 1:
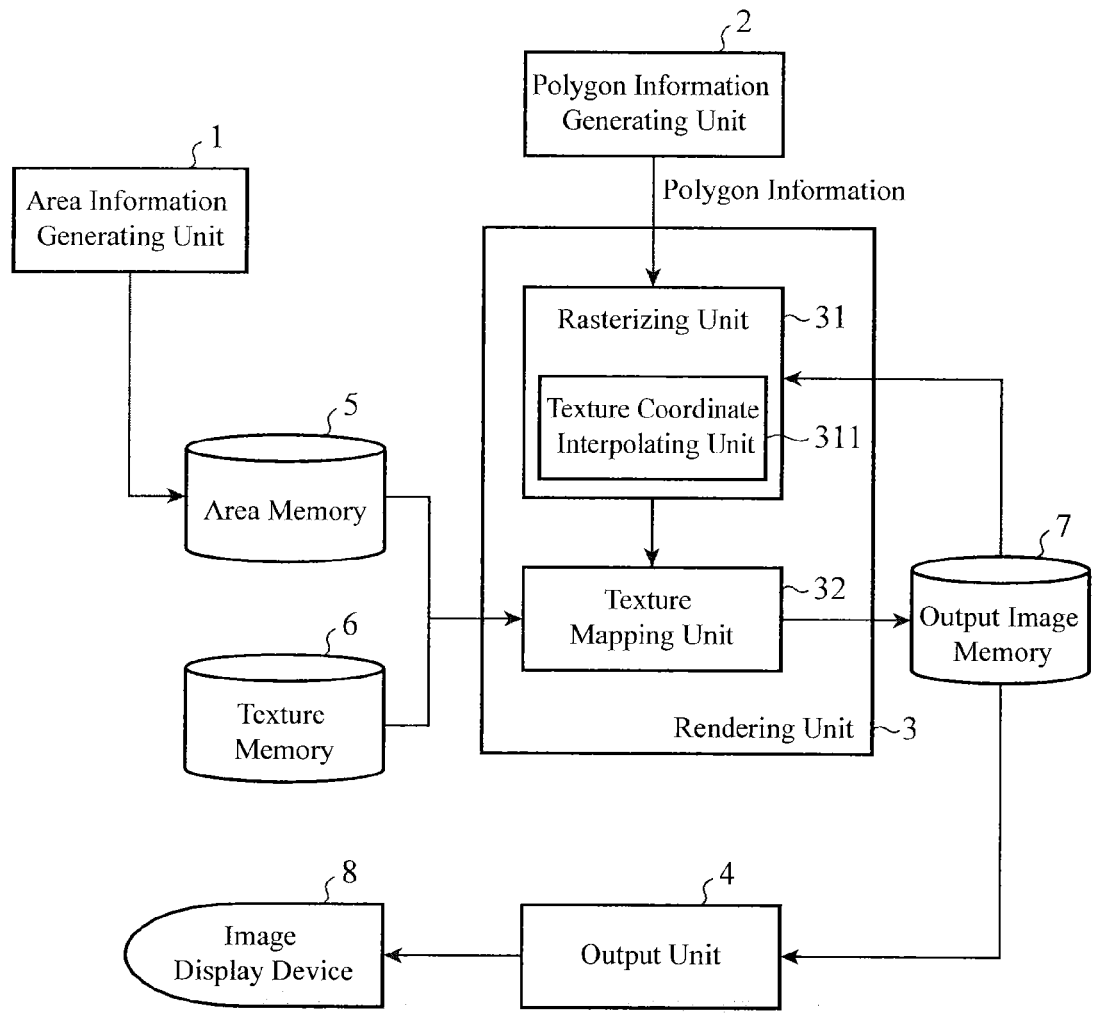
FIG. 1 is a block diagram showing a texture mapping device in accordance with Embodiment 1 of the present invention.

FIG. 1 is a block diagram showing a texture mapping device in accordance with this embodiment. The texture mapping device shown in this figure is comprised of an area information generating unit 1, a polygon information generating unit 2, a rendering unit 3, an output unit 4, an area memory 5, a texture memory 6, and an output image memory 7.

The area information generating unit 1 generates pieces of area information each showing an arbitrary rectangular area within a texture image, assigns an ID to each of the pieces of area information, and stores these pieces of area information in the area memory 5. The polygon information generating unit 2 generates polygon information including at least plural pieces of vertex information and an area ID specifying one of the above-mentioned pieces of area information. The rendering unit 3 generates an output image on the output image memory 7 by repeatedly mapping a part of the texture image which exists within the rectangular area determined by the area ID of the polygon information generated by the polygon information generating unit 2 into the inside of a polygon on the output image to determine the color of each pixel located inside the above-mentioned polygon. The output unit 4 outputs the output image generated on the output image memory 7 to an image display device 8. Further, the area memory 5 stores the pieces of area information, and the texture memory 6 stores the texture image. In addition, the output image memory 7 stores the output image generated by the rendering unit 3. Further, the image display device 8 displays the output image.

Next, the operation of each unit of the texture mapping device in accordance with Embodiment 1 will be explained. First, the operation of the area information generating unit 1 will be explained by using FIGS. 2 to 4. The area information generating unit 1 generates plural pieces of area information each showing an arbitrary rectangular area within the texture image stored in the texture memory 6, and provides a specific ID to each of the plural pieces of area information, and stores these pieces of area information in the area memory 5. In this case, it is assumed that the texture image is recorded in the texture memory 6 as a two dimensional array of pixel values each showing color information, and falls within a range of $0.0 \leq u \leq 1.0$ and $0.0 \leq v \leq 1.0$ on two-dimensional space defined by coordinate axes u and v regardless of the resolution. More specifically, when the texture image consists of M×N pixels, the length of each pixel in a u-axis direction and that in a v-axis direction are 1/M and 1/N, respectively. It is further assumed that the coordinates of the center position of each pixel show the position of the pixel.

Figure 2:
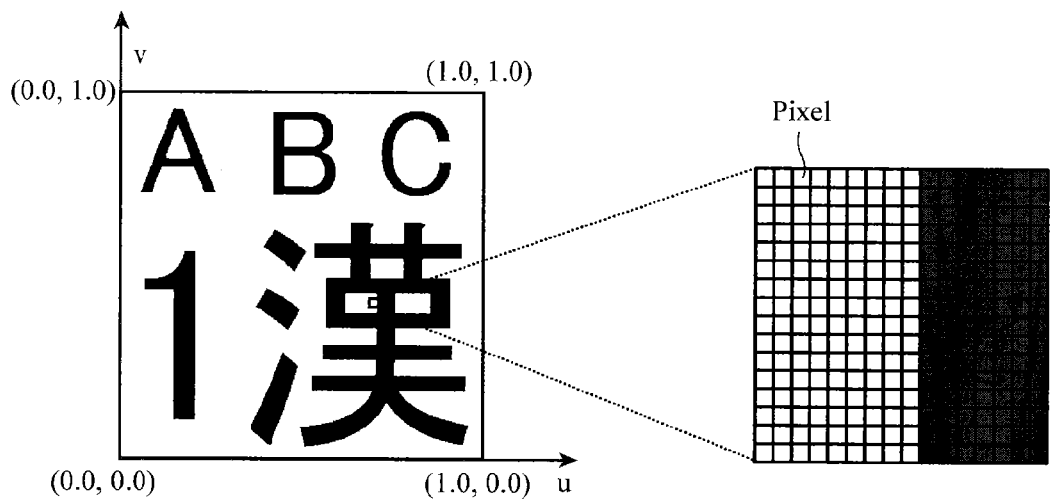
FIG. 2 is an explanatory drawing showing a coordinate system defining a texture image and an example of the texture image in the texture mapping device in accordance with Embodiment 1 of the present invention.

FIG. 2 is a diagram showing an example of the space defining the texture image and the texture image. Each area information is expressed by four numerical values (uR, vR, wR, hR), and these numerical values show the smallest u-coordinate and the smallest v-coordinate of the corresponding area, and the width in the u-axis direction and the width in the v-axis direction of the corresponding area, respectively. A method of determining each area information is arbitrary. For example, a programmer can determine each area information by using a method of specifying each area manually. FIG. 3 shows an example of a result of generating pieces of area information within the texture image, and FIG. 4 shows the pieces of area information of FIG. 3 stored in the area memory 5.

Next, the operation of the polygon information generating unit 2 will be explained by using FIGS. 5 to 7. The polygon information generating unit 2 generates polygon information including plural pieces of vertex information which construct a polygon, and an area ID for specifying an area generated by the area information generating unit 1, and outputs the polygon information to the rendering unit 3. Each vertex information consists of at least position coordinates showing the position of a vertex on the output image, and texture coordinates. Further, the number of vertices which construct the polygon is arbitrary. In this embodiment, a triangular polygon will be explained as an example of the polygon.

In this example, the vertices which construct the polygon information are designated by A, B, and C, respectively, the position coordinates and the texture coordinates of the vertex A are designated by xA, yA, and uA, vA, respectively, the position coordinates and the texture coordinates of the vertex B are designated by xB, yB, and uB, vB, respectively, and the position coordinates and the texture coordinates of the vertex C are designated by xC, yC, and uC, vC, respectively. It is assumed that the output image is recorded in the output image memory 7 as a two dimensional array of pixel values, and falls within a range of $0.0 \leq x \leq 1.0$ and $0.0 \leq y \leq 1.0$ on two-dimensional space expressed by coordinate axes x and y regardless of the resolution.

FIG. 5 shows the coordinate system of the output image, and an example of the output image that is initialized to white. The texture coordinates that construct each vertex information are expressed as coordinates which are defined with the point at the lower left corner of the rectangular area specified by the above-mentioned area ID being assumed to be (u, v)=(0.0, 0.0) and the point at the upper right corner of the rectangular area being assumed to be (u, v)=(1.0, 1.0), and, when either one of the texture coordinates has a value equal to or less than 0.0, or equal to or greater than 1.0, the texture image within the above-mentioned rectangular area is repeatedly mapped into the polygon. For example, when the texture coordinates of the vertex A are specified as (uA, vA)=(0.5, 0.5), the point corresponding to the center of the area specified by the above-mentioned area ID is mapped to the vertex A.

Figure 7:
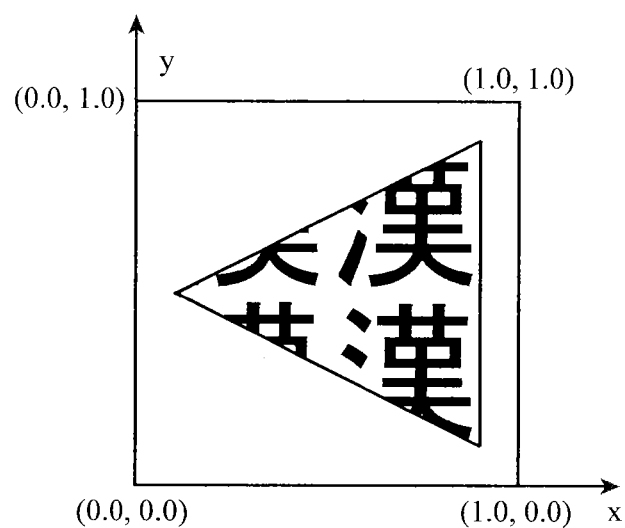
FIG. 7 is an explanatory drawing showing an output image acquired as a result of drawing the polygon information shown in FIG. 6 by using the texture image shown in FIG. 2 and the area information shown in FIG. 4 in the texture mapping device in accordance with Embodiment 1 of the present invention.

FIG. 6 shows an example of the polygon information and FIG. 7 shows the output image which should be a result of drawing the example shown in FIG. 6 by using the texture image shown in FIG. 2. A method of generating vertex coordinates which construct the polygon information is arbitrary. For example, a programmer generates the vertex coordinates of each polygon in a three-dimensional polygon model which the programmer constructs by using modeling software or the like by carrying out projection conversion of the vertex coordinates onto space defining the output image. A method of generating an ID and texture coordinates which construct the polygon information is arbitrary. For example, the programmer generates an ID and texture coordinates by directly specifying the ID and the texture coordinates.

Figure 8:
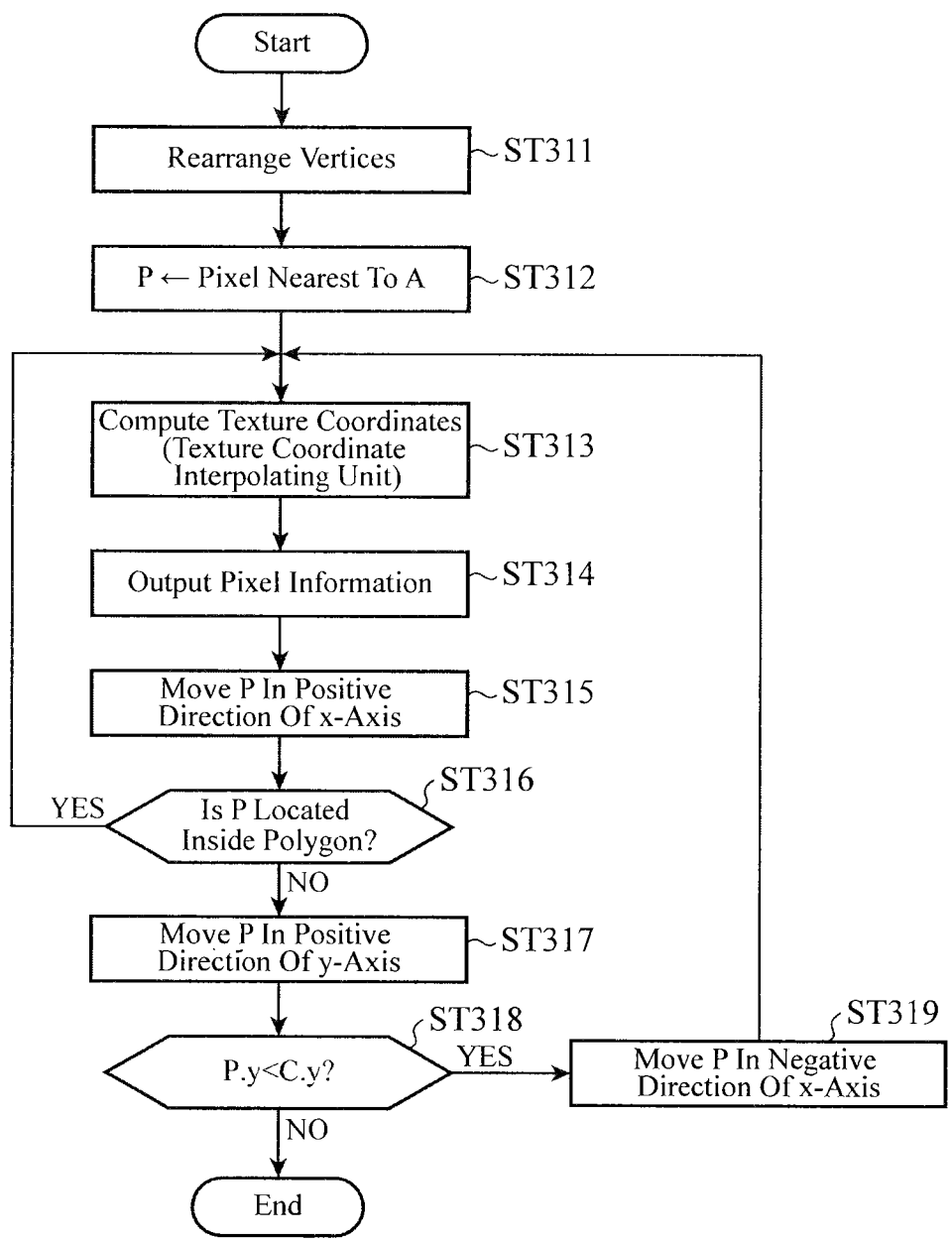
FIG. 8 is a flow chart showing a process carried out by a rasterizing unit in the texture mapping device in accordance with Embodiment 1 of the present invention.
Figures 10, 11:
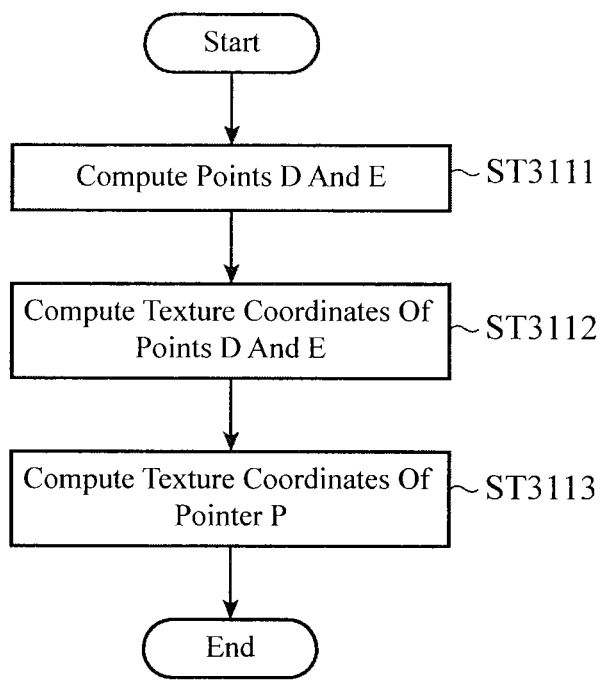
FIG. 10 is an explanatory drawing showing an example of the pixel information outputted from the rasterizing unit in the texture mapping device in accordance with Embodiment 1 of the present invention.
FIG. 11 is a flow chart showing a process carried out by a texture coordinate interpolating unit in the texture mapping device in accordance with Embodiment 1 of the present invention.

Next, the operation of a rasterizing unit 31 which constructs the rendering unit 3 will be explained by using FIGS. 8 to 10. FIG. 8 is a flow chart showing a flow of the process carried out by the rasterizing unit 31. The rasterizing unit 31 compares the y coordinates of the vertices of the polygon with one another, and sorts the vertices in ascending order of their y coordinates and renames the vertices sorted thereby as A, B, and C (step ST311). FIG. 9 shows a result of applying step ST311 to the polygon information shown in FIG. 6. In addition, a pointer P showing a reference to a pixel of the output image is prepared, and the rasterizing unit sets the reference destination of the pointer P to the pixel existing on the output image and within the polygon and being the nearest to the vertex A (step ST312). Next, a texture coordinate interpolating unit 311 interpolates texture coordinates (uP, vP) from the texture coordinates of the vertices A, B, and C according to the position coordinates of the pixel pointed to by the pointer P to compute the texture coordinates (uP, vP) (step ST313), and outputs the texture coordinates computed thereby, the area ID of the above-mentioned polygon, and the position coordinates of the above-mentioned pixel as pixel information to a texture mapping unit 32 (step ST314). FIG. 10 shows some examples of the outputted pixel information.

After outputting the pixel information, the rasterizing unit sets the reference destination of the pointer P to the pixel next to the previous pixel in the positive direction of the x-axis (step ST315). At this time, when the pixel pointed to by the pointer P is located inside the polygon, the rasterizing unit returns to step ST313 (step ST316). In contrast, when the pixel pointed to by the pointer P is located outside the polygon, the rasterizing unit sets the reference destination of the pointer P to the pixel next to the previous pixel in the positive direction of the y-axis (step ST317). At this time, when the y coordinate of the pixel pointed to by the pointer P is larger than that of the vertex C, the rasterizing unit ends the process, otherwise the rasterizing unit continues the process (step ST318). Finally, the rasterizing unit changes the reference destination of the pointer P to the pixel having the smallest x coordinate among the pixels located at the same y coordinate as the pixel pointed to by the pointer P and inside the polygon, and then returns to step ST313 (step ST319).

Figure 12:
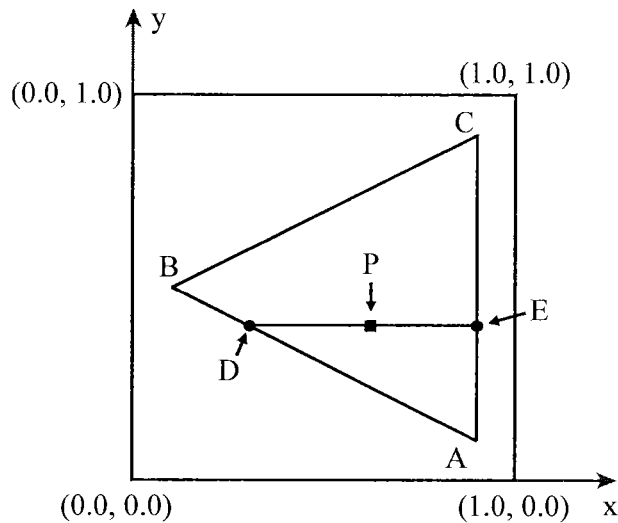
FIG. 12 is an explanatory drawing showing a positional relationship among points and a pixel which are used by the texture coordinate interpolating unit in the texture mapping device in accordance with Embodiment 1 of the present invention.

The operation of the texture coordinate interpolating unit 311 which constructs the rasterizing unit 31 will be explained by using FIGS. 11 and 12. FIG. 11 is a flow chart showing a flow of the process carried out by the texture coordinate interpolating unit 311. The texture coordinate interpolating unit 311 computes the two points of intersection between a straight line extending from the position of the pixel pointed to by the pointer P in parallel to the x-axis, and the sides of the polygon first, and expresses the point of intersection having a smaller x coordinate as a point D and also expresses the other one having a larger x coordinate as a point E (step ST3111). FIG. 12 is a diagram showing a positional relationship among the pointer P, the point D, and the point E.

Next, the texture coordinate interpolating unit expresses the position coordinates of the point D as (xD, yD), and interpolates texture coordinates (uD, vD) at the position of the point D from the texture coordinates of the vertices A, B, and C by using the next equation to compute the texture coordinates (uD, vD) (step ST3112).

When the point D is on the side AB:

$$uD=uA\times(yB-yD)/(yB-yA)+uB\times(yD-yA)/(yB-yA)$$

$$vD=vA\times(yB-yD)/(yB-yA)+vB\times(yD-yA)/(yB-yA)$$

When the point D is on the side BC:

$$uD=uB\times(yC-yD)/(yC-yB)+uC\times(yD-yB)/(yC-yB)$$

$$vD=vB\times(yC-yD)/(yC-yB)+vC\times(yD-yB)/(yC-yB)$$

When the point D is on the side AC:

$$uD=uA\times(yC-yD)/(yC-yA)+uC\times(yD-yA)/(yC-yA)$$

$$vD=vA\times(yC-yD)/(yC-yA)+vC\times(yD-yA)/(yC-yA)$$

Similarly, the texture coordinate interpolating unit expresses the position coordinates of the point E as (xE, yE), and interpolates texture coordinates (uE, vE) at the position of the point E from the texture coordinates of the vertices A, B, and C by using the same method as that which the texture coordinate interpolating unit uses at the time of computing (uD, vD) to compute the texture coordinates (uE, vE). Finally, the texture coordinate interpolating unit expresses the position coordinates of the pixel pointed to by the pointer P as (xP, yP), and interpolates texture coordinates (uP, vP) at the position of the pixel pointed to by the pointer P from the texture coordinates (uD, vD) and (uE, vE) by using the next equation to compute the texture coordinates (uP, vP), and then returns the texture coordinates to the rasterizing unit 31 (ST3113).

$$uP=uD\times(xE-xP)/(xE-xD)+uE\times(xP-xD)/(xE-xD)$$

$$vP=vD\times(xE-xP)/(xE-xD)+vE\times(xP-xD)/(xE-xD)$$

Figure 13:
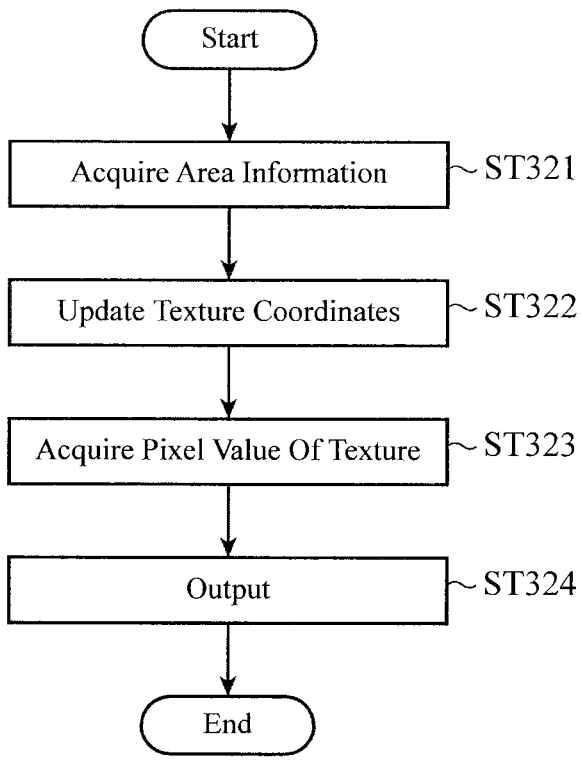
FIG. 13 is a flow chart showing a process carried out by a texture mapping unit in the texture mapping device in accordance with Embodiment 1 of the present invention.
Figures 14, 15, 16:
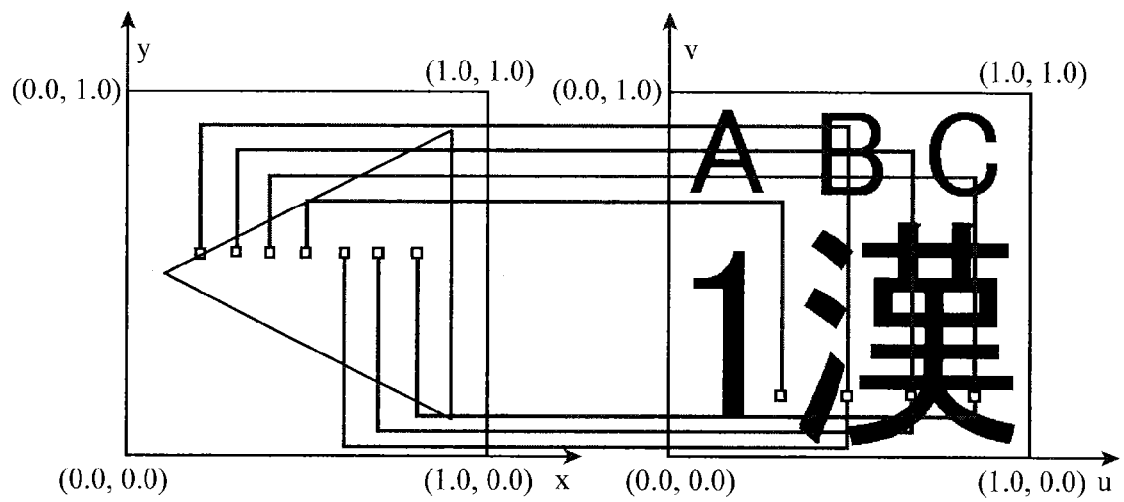
FIG. 14 is an explanatory drawing showing a result of processing the pixel information shown in FIG. 10 by the texture mapping unit in the texture mapping device in accordance with Embodiment 1 of the present invention.
FIG. 15 is an explanatory drawing showing a relationship between the position coordinates of the pixel information shown in FIG. 14 and texture coordinates in the texture mapping device in accordance with Embodiment 1 of the present invention.
FIG. 16 is an explanatory drawing showing another example of the polygon information generated by the polygon information generating unit in the texture mapping device in accordance with Embodiment 1 of the present invention generates.

The operation of the texture mapping unit 32 which constructs the rendering unit 3 will be explained by using FIGS. 13 to 15. FIG. 13 is a flow chart showing a flow of the process carried out by the texture mapping unit 32. The texture mapping unit 32 acquires the area information (uR, vR, wR, hR) shown by the area ID of the pixel information outputted from the rasterizing unit 31 from the area memory 5 (step ST321). The texture mapping unit then processes the texture coordinates (uP, vP) of the pixel information to compute (uP', vP') by using the next equation.

$$uP'=uR+\text{fract}(uP)\times wR$$

$$vP'=vR+\text{fract}(vP)\times hR$$

where fract(r) shows a value which is a result of subtracting the largest one of integers that do not exceed a real number r from the real number r. The texture mapping unit then overwrites the texture coordinates (uP, vP) of the pixel information with (uP', vP') to update the texture coordinates (step ST322). FIG. 14 shows the result of updating the pixel information shown in FIG. 10 in step ST322.

After updating the texture coordinates, the texture mapping unit 32 extracts a pixel value from the texture image by using the updated texture coordinates, and substitutes the pixel value into the pixel shown by the position coordinates of the pixel information on the output image (step ST324). However, because the texture coordinates of the pixel information do not necessarily show the center position of a pixel of the texture image, when acquiring a pixel value, the texture mapping unit extracts an appropriate pixel value by using a method of performing interpolation on the pixel values of a plurality of pixels having coordinates close to the above-mentioned texture coordinates.

Further, when determining each pixel value of the output image, instead of substituting a pixel value acquired from the texture image into a corresponding pixel of the output image, just as it is, the texture mapping unit can provide color information other than the pixel value acquired from the texture image to the polygon and use the color information by, for example, performing a lighting process on the polygon to add color information to the polygon and blending the color information with the pixel value acquired from the texture image, and then outputting the blend color. FIG. 15 shows a correspondence between the position on the output image which is shown by the position coordinates of each pixel information shown in FIG. 14, and the position on the texture image which is shown by the texture coordinates.

Although the rendering unit 3 which carries out the above-mentioned operation mainly consists of a GPU (Graphics Processing Unit), the rendering unit cannot handle information about each polygon, such as an area ID of each polygon information, because most of GPUs handle polygon information as a set of pieces of information about each vertex. In this case, although the rendering unit can be made to support information about each polygon by changing the configuration of the polygon information which the polygon information generating unit 2 generates and providing an area ID for each vertex information, the number of variables increases.

To solve this problem, the texture mapping device can be constructed in such a way that the polygon information generating unit 2 generates a variable which is a combination of an area ID and texture coordinates, and receives this variable instead of texture coordinates, and the texture mapping unit 32 decomposes the variable into the area ID and the texture coordinates.

More specifically, for example, no area ID is provided for the polygon information which the polygon information generating unit 2 outputs, and the texture coordinates (uA, vA), (uB, vB), and (uC, vC) of each vertex information are replaced by (uA", vA"), (uB", vB"), and (uC", vC") shown by the following equations, respectively.

$$uA''=\text{area ID}\times 100+uA$$

$$vA''=vA$$

$$uB''=\text{area ID}\times 100+uB$$

$$vB''=vB$$

$$uC''=\text{area ID}\times 100+uC$$

$$vC''=vC$$

where $0 \leq uA, uB,$ and $uC < 100.0$. In FIG. 16, the polygon information shown in FIG. 6 in which the texture coordinates are replaced according to the above-mentioned method is shown.

Figures 17, 18:
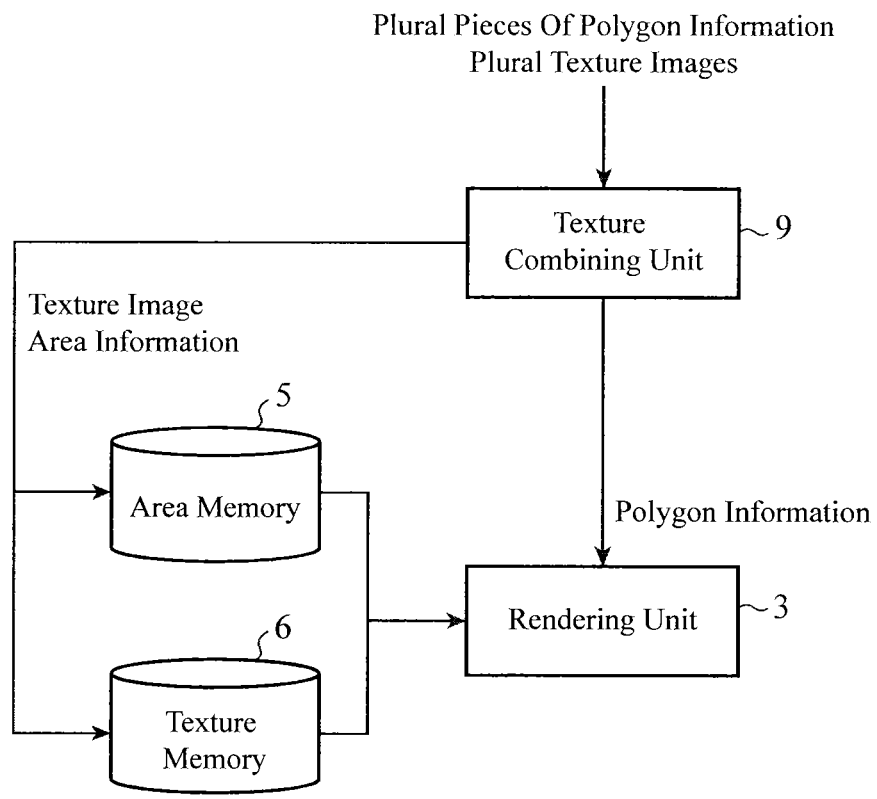
FIG. 17 is an explanatory drawing showing an example of pixel information which is outputted as a result of inputting the polygon information shown in FIG. 16 into the rasterizing unit the texture mapping device in accordance with Embodiment 1 of the present invention.
FIG. 18 is a block diagram showing main components of a texture mapping device in accordance with Embodiment 2 of the present invention.

The rasterizing unit 31 further interpolates the texture coordinates uP" and vP" of each pixel from the texture coordinates of the vertices according to the same procedure as that which the rasterizing unit uses at the time of computing uP and vP to compute the texture coordinates uP" and vP". FIG. 17 shows pieces of pixel information which are results of processing the pieces of polygon information shown in FIG. 16 by the rasterizing unit 31.

After that, the texture mapping unit 32 can acquire the same result as that acquired in the case of providing an area ID for each polygon information by, in step ST322, computing the texture coordinates (uP', vP') at the same time when the texture mapping unit reconstructs an area ID by using the next equation.

$$\text{area ID}=\text{floor}(u/100)$$

$$uP'=uR+\text{fract}(uP'')\times wR$$

$$vP'=vR+\text{fract}(vP'')\times hR$$

where floor (r) is the largest one of integers that do not exceed a real number r.

Finally, the operation of the output unit 4 will be explained. After the texture mapping unit 32 completes the process on every of all the pieces of polygon information which the polygon information generating unit 2 has generated, the output unit 4 outputs the output image stored in the output image memory 7 to the image display device 8. As a result, the image display device 8 displays the output image stored in the output image memory 7.

As previously explained, because the texture mapping device in accordance with Embodiment 1 includes: the area information generating unit for generating plural pieces of area information each showing a partial area of a texture image; the polygon information generating unit for generating polygon information including plural pieces of vertex information each including coordinates of a vertex on an output image and texture coordinates brought into correspondence with the vertex, and an area ID for specifying one of the plural pieces of area information; the rasterizing unit for generating pixel information including position coordinates, texture coordinates, and an area ID for every of all pixels located inside a polygon on the output image, the polygon being shown by the polygon information; the texture mapping unit for processing the texture coordinates of the pixel information by using the area information specified by the area ID of the pixel information, and for acquiring a pixel value from the texture image by using the processed texture coordinates and determining a pixel value of a pixel on the output image, the pixel being shown by the position coordinates of the pixel information, by using the pixel value acquired thereby; and the output unit for outputting an output of the texture mapping unit to the image display device, the texture mapping device can repeatedly map a rectangular area having an arbitrary width and an arbitrary height in the texture image to the polygon. Therefore, because the texture mapping device can shorten the length of time required to carry out enlarging or reducing of each of the width and the height of the rectangular area to a power of 2 in advance, and can prevent an increase in the image size or degradation in the image quality from resulting from the enlargement or reduction of each of the width and the height of the rectangular area, the texture mapping device can use the texture image having required image quality expressed with a minimum size.

Further, because in the texture mapping device in accordance with Embodiment 1, after projecting the position of each vertex onto two-dimensional coordinates on the output image by carrying out projection conversion on the polygon information having position coordinates defined in three-dimensional space according to a position of a virtual viewpoint at a time of drawing, the polygon information generating unit outputs the polygon information to the rasterizing unit, the texture mapping device can generate the polygon information with a high degree of precision.

In addition, because in the texture mapping device in accordance with Embodiment 1, for every of all pixels located inside the polygon shown by the polygon information on the output image, the rasterizing unit interpolates texture coordinates from the texture coordinates of each vertex according to a positional relationship between the position of each vertex which constructs the polygon information and the position of the pixel to compute the texture coordinates, and outputs the coordinates of the position of the pixel and the area ID which the polygon information has as pixel information, the texture mapping device can generate the polygon information with a high degree of precision.

Further, because in the texture mapping device in accordance with Embodiment 1, the texture mapping unit processes the texture coordinates of the pixel information which the rasterizing unit outputs in such a way that the texture coordinates fall within a rectangle shown by the area information specified by the area ID of the pixel information, and acquires a pixel value from the texture image by using the texture coordinates processed thereby, the texture mapping device can easily carry out the texture mapping with reliability.

In addition, because in the texture mapping device in accordance with Embodiment 1, the polygon information generating unit does not hold the area ID which constructs the polygon information as an element of the polygon information directly, but processes each vertex information in such a way that the area ID can be reconstructed from the pixel information inputted to the texture mapping unit, thereby holding the area ID as a part of the vertex information, the texture mapping device can acquire the same results as those which the texture mapping device acquires in the case of providing an area ID for each polygon information.

Further, because in the texture mapping device in accordance with Embodiment 1, the texture mapping unit reconstructs an index of the area ID of the polygon information from the pixel information inputted thereto, and acquires the area information by using the index reconstructed thereby, the texture mapping device can acquire the same results as those which the texture mapping device acquires in the case of providing an area ID for each polygon information.

Embodiment 2.

In Embodiment 1, the area information generating unit 1 generates pieces of area information each showing an arbitrary rectangular area in a texture image, and stores the pieces of area information in the area memory 5, the polygon information generating unit 2 generates polygon information including vertex information having texture coordinates in each area which is assumed to be space of 0.0≤u≤1.0 and 0.0≤v≤1.0 and an area ID for specifying an area, and, after that, the rendering unit 3 draws a polygon by using the polygon information, the pieces of area information, and the texture image.

However, because texture images each of which is repeatedly mapped to a polygon are prepared as single texture images, respectively, when constructing a polygon model by using a general modeling tool or the like, the polygon model is comprised of plural pieces of polygon information and a plurality of texture images. Therefore, in accordance with Embodiment 2, an example of, from a plurality of texture images and plural pieces of polygon information, automatically generating a single texture image and plural pieces of polygon information which make it possible to acquire the same drawing result as that of drawing the above-mentioned plurality of texture images and the above-mentioned plural pieces of polygon information, and inputting the single texture image and the plural pieces of polygon information to a rendering unit 3, an area memory 5, and a texture memory 6 will be explained.

FIG. 18 is a block diagram of main components of a texture mapping device in accordance with Embodiment 2. The texture mapping device in accordance with Embodiment 2 additionally includes a texture combining unit 9 for receiving plural pieces of polygon information and a plurality of texture images as its input, instead of the area information generating unit 1 and the polygon information generating unit 2 in accordance with Embodiment 1. More specifically, the texture combining unit 9 receives a plurality of texture images each including an image and a unique ID, and polygon information including texture IDs respectively specifying the plurality of texture images and plural pieces of vertex information, and generates a single texture image and plural pieces of area information from the plurality of texture images and also generates new polygon information including an area ID for specifying an area and plural pieces of vertex information. Because the other components of the texture mapping device in accordance with Embodiment 2 are the same as those in accordance with Embodiment 1, the explanation of the other components will be omitted hereafter.

Figure 19:
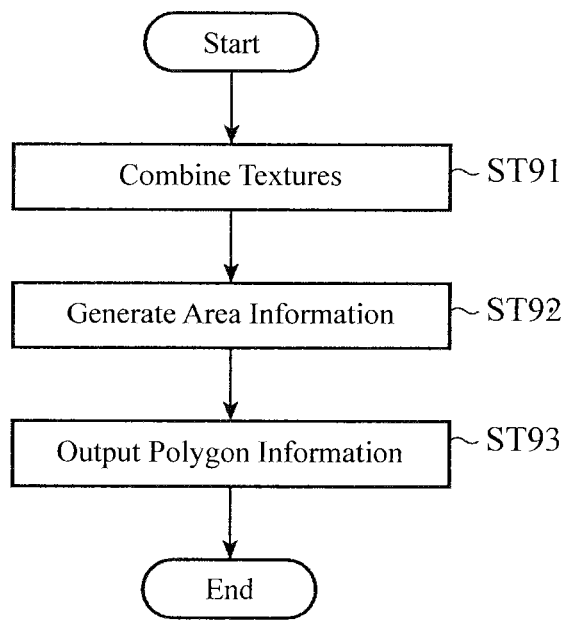
FIG. 19 is a flow chart showing a process carried out by a texture combining unit in the texture mapping device in accordance with Embodiment 2 of the present invention.
Figure 20:
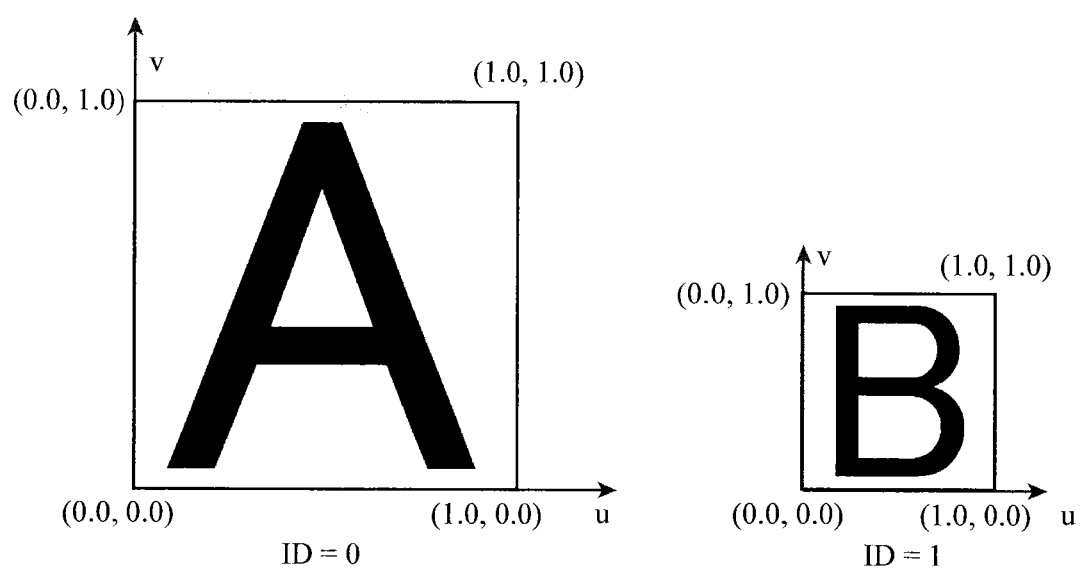
FIG. 20 is an explanatory drawing showing an example of a plurality of texture images inputted to the texture combining unit in the texture mapping device in accordance with Embodiment 2 of the present invention.

Next, the operation of the texture mapping device in accordance with Embodiment 2 will be explained. Because the operation of any component in accordance with Embodiment 2 other than the texture combining unit 9 is the same as that in accordance with Embodiment 1, only the operation of the texture combining unit 9 will be explained hereafter. Hereafter, the operation of the texture combining unit 9 will be explained by using FIGS. 19 to 24. FIG. 19 is a flow chart showing a flow of the process carried out by the texture combining unit 9. Each texture image inputted to the texture combining unit has a unique ID for identifying the texture image to be mapped onto a polygon in addition to an image which is defined as an array of pixel values in two-dimensional space of 0.0≤u≤1.0 and 0.0≤v≤1.0, and which is similar to that explained in Embodiment 1. FIG. 20 is a diagram showing two texture images having different resolutions as an example of the texture images inputted.

For the sake of simplicity, it is further assumed that the polygon information inputted shows a triangular polygon which consists of three vertices A, B, and C, like that shown in Embodiment 1. The polygon information can include a texture ID showing a texture image to be mapped, pieces of vertex information xA, yA, uA, and vA about the vertex A, pieces of vertex information xB, yB, uB, and vB about the vertex B, and pieces of vertex information xC, yC, uC, and vC about the vertex C. FIG. 21 is a diagram showing of polygon information including two texture IDs and two pieces of vertex information respectively corresponding to these texture IDs as an example of the polygon information to be inputted. FIG. 22 is a diagram showing a result of drawing the polygon information shown in FIG. 21 by using the textures shown in FIG. 20 by a general drawing device.

Returning to FIG. 19, the texture combining unit 9 combines the texture images into a new texture image while setting an area of 0.0≤u≤1.0 and 0.0≤v≤1.0 as a rectangular area including the new texture image into which the texture images are combined, and records the new texture image in the texture memory 6 (step ST91). FIG. 23 is a diagram showing an example of combining the two textures shown in FIG. 20 in such a way to arrange the two textures in a horizontal direction. A method of combining the texture images is arbitrary. For example, the texture images are combined by using a method of optimizing the position of each of the texture images in such a way that the size of the rectangle including the new image into which the texture images are combined is minimized.

The texture combining unit 9 then records a rectangular area, which is occupied by each of the images, in the new image into which the images are combined, and the ID of each of the images into the area memory 5 as area information (step ST92). FIG. 24 shows the area information generated from the texture image shown in FIG. 23.

Finally, the texture combining unit 9 sets the texture IDs of the polygon information as the area ID, just as it is, and outputs the area ID to the rendering unit 3 (step ST93). The vertex coordinates of each polygon are two-dimensional. As an alternative, the vertex coordinates of each polygon can be three-or-more-dimensional, and the texture mapping device can carry out projection conversion of each polygon onto two-dimensional space defining the output image in step ST93, for example.

As previously explained, because the texture mapping device in accordance with Embodiment 2 includes: the texture combining unit for receiving a plurality of texture images each including an image and a unique ID, and polygon information including texture IDs respectively specifying the plurality of texture images and plural pieces of vertex information, and for generating a single texture image and plural pieces of area information from the plurality of texture images and also generating new polygon information including an area ID specifying an area and plural pieces of vertex information; the rasterizing unit for generating pixel information including position coordinates, texture coordinates, and an area ID for every of all pixels located inside a polygon shown by the new polygon information on an output image; the texture mapping unit for processing the texture coordinates of the pixel information by using the area information specified by the area ID of the pixel information, and for acquiring a pixel value from the texture image generated by the texture combining unit by using the texture coordinates processed thereby and determining a pixel value of a pixel on the output image which is specified by the position coordinates of the pixel information by using the pixel value acquired thereby; and the output unit for outputting an output of the texture mapping unit to the image display device, the texture mapping device can repeatedly map a rectangular area having an arbitrary width and an arbitrary height in a texture image to a polygon even in a system that prepares texture images each of which is repeatedly mapped to a polygon as single texture images, respectively.

Further, because in the texture mapping device in accordance with Embodiment 2, the texture combining unit combines the plurality of texture images into a single texture image and generates an area in the single texture image which is occupied by each of the texture images which is yet to be combined as area information, the texture mapping device can easily generate polygon information with reliability.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

As mentioned above, when drawing a polygon, the texture mapping device in accordance with the present invention determines the color information of each pixel located inside the polygon by using a texture image, and is suitable for texture mapping in computer graphics.

EXPLANATIONS OF REFERENCE NUMERALS 1 area information generating unit, 2 polygon information generating unit, 3 rendering unit, 4 output unit, 5 area memory, 6 texture memory, 7 output image memory, 8 image display device, 9 texture combining unit, 31 rasterizing unit, 32 texture mapping unit, 311 texture coordinate interpolating unit.

The invention claimed is:
1. A texture mapping device comprising:
a processor to execute a program; and
a memory to store the program which, when executed by the processor, results in performance of steps comprising:
generating plural pieces of area information each showing a partial area of a texture image;
generating polygon information including plural pieces of vertex information each including coordinates of a vertex on an output image and texture coordinates brought into correspondence with the vertex, and an area ID for specifying one of said plural pieces of area information;
generating pixel information including position coordinates, texture coordinates, and an area ID for every of all pixels located inside a polygon on said output image, said polygon being shown by said polygon information;
processing the texture coordinates of said pixel information by using the area information specified by the area ID of said pixel information, and acquiring a pixel value from said texture image by using said processed texture coordinates and determining a pixel value of a pixel on the output image, the pixel being shown by the position coordinates of said pixel information, by using said pixel value acquired thereby; and
outputting an output of said processing the texture coordinates to an image display device,
wherein said polygon information generating does not use said area ID which constructs said polygon information as an element of said polygon information directly, but processes each vertex information in such a way that said area ID can be reconstructed from the pixel information inputted to said processing the texture coordinates, thereby holding said area ID as a part of the vertex information.

2. The texture mapping device according to claim 1, wherein after projecting positions of the vertices onto two-dimensional coordinates on the output image by carrying out projection conversion on the polygon information having position coordinates defined in three-dimensional space according to a position of a virtual viewpoint at a time of drawing, the polygon information generating outputs the polygon information to the generating pixel information.

3. The texture mapping device according to claim 1, wherein for every of all pixels located inside the polygon shown by the polygon information on the output image, the generating pixel information interpolates texture coordinates from the texture coordinates of each vertex according to a positional relationship between the position of each vertex which constructs said polygon information and a position of the pixel to compute the texture coordinates, and outputs coordinates of the position of said pixel and the area ID which said polygon information has as pixel information.

4. The texture mapping device according to claim 1, wherein the processing the texture coordinates processes the texture coordinates of the pixel information which the generating pixel information outputs in such a way that the texture coordinates fall within a rectangle shown by the area information specified by the area ID of said pixel information, and acquires a pixel value from the texture image by using said texture coordinates processed thereby.

5. The texture mapping device according to claim 1, wherein the processing the texture coordinates reconstructs an index of the area ID of the polygon information from the pixel information inputted thereto, and acquires the area information by using the index reconstructed thereby.

6. The texture mapping device according to claim 5, wherein said processing the texture coordinates is performed by replacing texture coordinates (uA, vA) included in the vertex information with texture coordinates (uA", vA") obtained as follows:

$$uA''=\text{area ID}\times 100+uA$$

$$vA''=vA$$

with $0 \le uA < 100.0$ and the vertex information is obtained by reconstructing the area ID as follows:

$$\text{area ID}=\text{floor}(u/100)$$

$$uA'=uA+\text{fract}(uA'')\times wA$$

$$vA'=vA+\text{fract}(vA'')\times hA$$

wherein uA is a texture coordinate of a vertex A in a u-axis direction, vA is a texture coordinate of a vertex A in a v-axis direction, the vertex A designates a vertex whose coordinates are included in one of the plural pieces of vertex information, fract (r) is a value which is a result of subtracting a largest one of integers that do not exceed a real number r from the real number r, floor (r) the largest one of integers that do not exceed a real number r, wA and hA are widths in the u-axis direction and v-axis direction, respectively, and (uA', vA') are reconstructed texture coordinates.

7. The texture mapping device according to claim 1, wherein the texture image is a data prepared to carry out texture mapping to the polygon.

8. A texture mapping device comprising:
a processor to execute a program; and
a memory to store the program which, when executed by the processor, results in performance of steps comprising:
receiving and combining a plurality of texture images each including an image and a unique ID, and polygon information including texture IDs respectively specifying said plurality of texture images and plural pieces of vertex information, and generating a single texture image and plural pieces of area information from said plurality of texture images and also generating new polygon information including an area ID specifying an area and plural pieces of vertex information;
generating pixel information including position coordinates, texture coordinates, and an area ID for every of all pixels located inside a polygon shown by said new polygon information on an output image;
processing the texture coordinates of said pixel information by using area information specified by the area ID of said pixel information, and for acquiring a pixel value from the single texture image by using said texture coordinates processed in combining the plurality of texture images and determining a pixel value of a pixel on the output image which is specified by the position coordinates of said pixel information by using said pixel value acquired thereby; and
outputting-an output of said processing the texture coordinates to an image display device.

9. The texture mapping device according to claim 8, wherein the combining a plurality of texture images combines the plurality of texture images into a single texture image and generates an area in the single texture image which is occupied by each of the texture images which is yet to be combined as area information.

10. The texture mapping device according to claim 8, wherein the texture image is a data prepared to carry out texture mapping to the polygon.

11. A texture mapping method comprising:
generating plural pieces of area information each showing a partial area of a texture image;
generating polygon information including plural pieces of vertex information each including coordinates of a vertex on an output image and texture coordinates brought into correspondence with the vertex, and an area ID for specifying one of said plural pieces of area information;
generating pixel information including position coordinates, texture coordinates, and an area ID for every one of all pixels located inside a polygon on said output image, said polygon being shown by said polygon information;
processing the texture coordinates of said pixel information by using the area information specified by the area ID of said pixel information;
acquiring a pixel value from the generated single texture image by using said processed texture coordinates to determine the pixel value of a pixel on the output image which is specified by the position coordinates of said pixel information; and
outputting the pixel value acquired in the acquiring step to an image display device,
wherein in said step of generating polygon information including plural pieces of vertex information each including coordinates of a vertex on an output image and texture coordinates brought into correspondence with the vertex, said area ID which constructs said polygon information as an element of said polygon information is not directly provided as it is a part of the vertex information and there is a further step of obtaining said area ID from each vertex information by processing each vertex information.

12. A texture mapping method comprising:
receiving a plurality of texture images each including an image and a unique ID, and polygon information including texture IDs respectively specifying said plurality of texture images and plural pieces of vertex information;
generating a single texture image and plural pieces of area information from said plurality of texture images and also generating new polygon information including an area ID specifying an area and plural pieces of vertex information;
generating pixel information including position coordinates, texture coordinates, and an area ID for every one of all pixels located inside a polygon shown by said new polygon information on an output image;
processing the texture coordinates of said pixel information by using area information specified by the area ID of said pixel information;
acquiring a pixel value from the generated single texture image by using said processed texture coordinates to determine the pixel value of a pixel on the output image which is specified by the position coordinates of said pixel information; and
outputting the pixel value acquired in the acquiring step to an image display device.

* * * * *